No. 889,289.
PATENTED JUNE 2, 1908.
C. WRIGHT.
BAND SAW SHARPENER.
APPLICATION FILED AUG. 6, 1906.
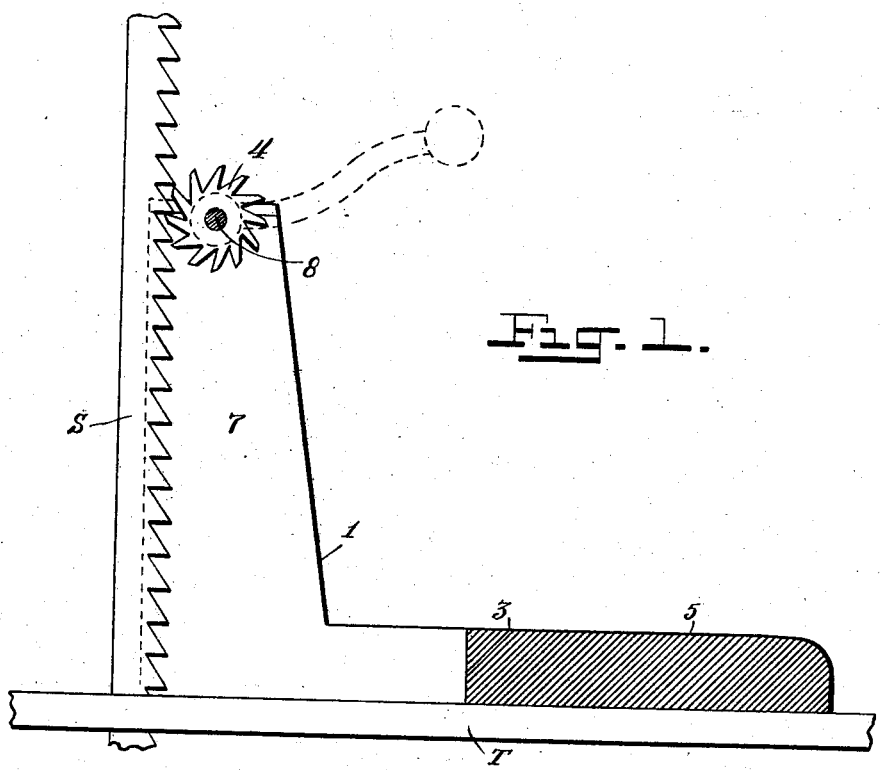
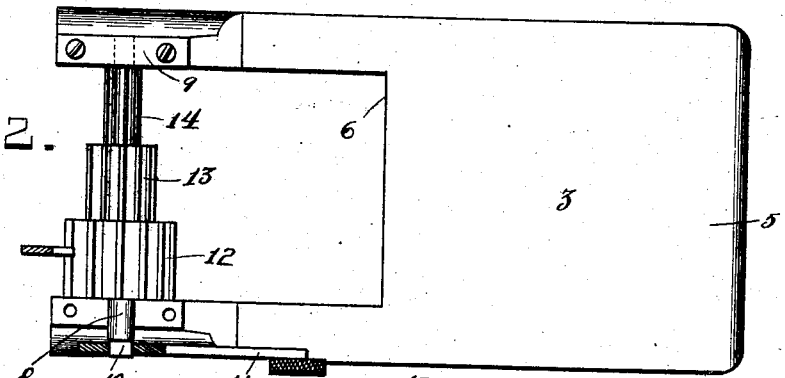
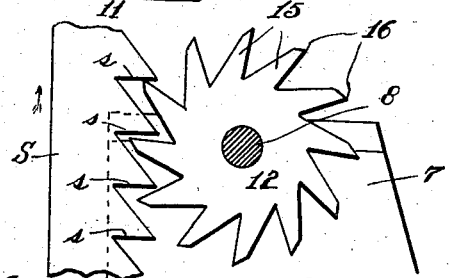

UNITED STATES PATENT OFFICE.

CHARLES WRIGHT, OF SOUTH GREENSBURG, PENNSYLVANIA, ASSIGNOR OF ONE-HALF TO J. A. BINKEY, OF SOUTH GREENSBURG, PENNSYLVANIA.

BAND-SAW SHARPENER.

No. 889,289.      Specification of Letters Patent.      Patented June 2, 1908.

Application filed August 6, 1906. Serial No. 329,497.

*To all whom it may concern:*

Be it known that I, CHARLES WRIGHT, a citizen of the United States, residing at South Greensburg, in the county of Westmoreland and State of Pennsylvania, have invented certain new and useful Improvements in Band-Saw Sharpeners; and I do declare the following to be a full, clear, and exact description of the invention, such as will enable others skilled in the art to which it appertains to make and use the same.

My invention relates to improvements in devices for sharpening band saws and consists in the novel construction, combination and arrangement of parts hereinafter described and claimed.

The object of the invention is to provide a simple and practical device, which may be used upon the table of a band saw machine to quickly and effectively sharpen the teeth of its saw without removing the latter from its pulleys.

The above and other objects which will appear as the nature of my invention is better understood, are accomplished by means of the construction illustrated in the accompanying drawings, in which:—

Figure 1 is a detail, vertical sectional view through the sharpener, showing it in its operative position on the table of a band saw machine; Fig. 2 is a top plan view of the sharpener; and Fig. 3 is a detail, sectional view on an enlarged scale, showing the operation of the rotary cutter of the sharpener.

Referring to the drawings by numeral, 1 denotes my improved sharpening device, which, as shown in Fig. 1, is mounted upon the table T of a band saw machine. The sharpener comprises a support 3, which rests upon the top of the table and carries a rotary cutter 4 adapted to engage the teeth of the band saw S. The support 3 is right angular in form consisting of a rectangular base 5, which slides upon the table T and has a slot or opening 6 at one end, from which latter rises two uprights 7. The cutter 4 is formed upon or secured to a horizontal shaft 8 having its ends journaled in bearings 9 provided upon the tops of the spaced uprights 7. On a rectangular portion 10 at one end of the shaft 8 is removably secured a crank handle 11 by means of which the device is operated.

The rotary cutter 4 is constructed so that it may be used on different sized saws and to enable this to be effectively done, it is preferably provided with three similar sections 12, 13, 14, which differ only in size, hence a description of one will suffice for all. Each section consists of an annular row of cutting teeth 15 having cutting edges 16, as clearly shown in Fig. 3. Said teeth 15 are adapted to mesh with the teeth of the saw S, and as the cutter is rotated, the cutting edges 16 are adapted to cut or scrape a thin shaving off of the lower sides s of the saw teeth and simultaneously move the saw upwardly, as will be seen upon reference to Fig. 3.

In operation, the base 5 of the support 3 is placed upon the table of the band saw machine and moved so that the proper section of the cutter is in mesh with the teeth of the band saw. The device is then held or secured in any suitable manner, while the crank handle 11 is rotated. The rotation of the cutter moves the saw upwardly and at the same time causes its cutting edges 16 to cut or scrape a light shaving from the bottom edges s of the saw teeth, as previously stated. It will thus be seen that the saw may be quickly and easily sharpened without removing it from the machine.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

In a band saw sharpener, a base designed to seat on and for movement upon the saw table and having an opening at its forward end, vertical standards provided at opposite sides of said opening and having bearings, a shaft journaled in said bearings said shaft being fixed against endwise movement, a plurality of cutters arranged in endwise relation to and for rotation with the shaft, said cutters being of relatively varying diameters and each having an annular series of cutting teeth and means for operating the shaft, the opening in the base being of a width equaling the combined length of all the cutters to permit transverse movement of the device for bringing any one of the cutters into operation.

In testimony whereof I have hereunto set my hand in presence of two subscribing witnesses.

CHARLES WRIGHT.

Witnesses:
  N. A. LOOR,
  J. A. BINKEY.